Aug. 25, 1953  R. S. KRAUSE ET AL  2,649,838
TELESCOPING MAGNIFYING LENS AND HANDLE
Filed May 11, 1949
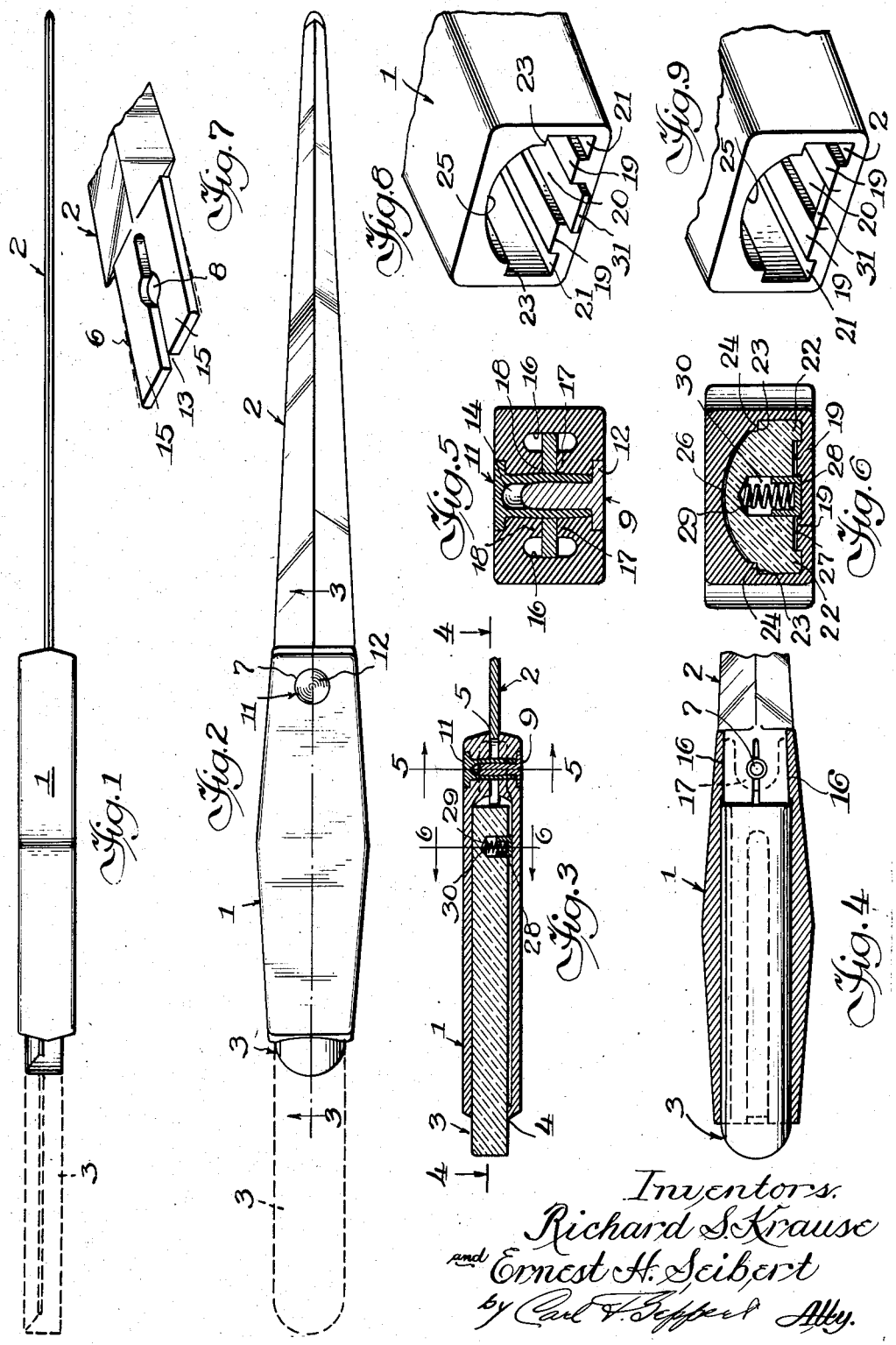
Inventors.
Richard S. Krause
and Ernest H. Seibert
by Carl F. Ruppert Atty.

Patented Aug. 25, 1953

2,649,838

UNITED STATES PATENT OFFICE 2,649,838

TELESCOPING MAGNIFYING LENS AND HANDLE

Richard S. Krause and Ernest H. Seibert, Chicago, Ill., assignors to Autopoint Company, Chicago, Ill., a corporation of Illinois Application May 11, 1949, Serial No. 92,674

1 Claim. (Cl. 88—39)

The present invention relates to a letter opener and magnifying lens and more particularly to a novel handle construction and means and manner of mounting the opener blade and the retractable magnifying lens.

Among the objects of the present invention is the provision of a novel handle formed or molded in one piece and cored in such manner as to receive and support the shank end of the opener blade. The present invention further comprehends the provision of a novel means and manner of rigidly and securely mounting the shank end of the letter opener or blade in the handle.

Another object of the present invention is the provision of a novel handle so formed and constructed as to receive and house therein a retractable magnifying lens which may be readily extended for use or retracted when not in use.

A further important object of the present invention is the provision of a novel means and manner of slidably mounting the magnifying lens in the handle whereby the reading surfaces of the lens are maintained at all times out of contact with adjacent surfaces in the handle and thus fully protected against damage. Furthermore, there is no occasion for contacting the lens except at the extreme end so that the reading surfaces are kept clean of finger marks.

The invention further comprehends providing the magnifying lens with a novel spring-pressed detent adapted to retain the lens in any of various extended positions, and also providing a stop cooperating with a stop or projection on the handle for limiting the extent to which the lens may be extended so as to prevent its complete withdrawal.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in side elevation of the novel letter opener and magnifying lens, the latter being shown retracted in full lines but also shown in dotted lines in extended position.

Fig. 2 is a plan view of the disclosure in Fig. 1.

Fig. 3 is a view in vertical cross section taken in a plane represented by the line 3—3 of Fig. 2.

Fig. 4 is a view in horizontal cross section taken in a plane represented by the line 4—4 of Fig. 3.

Fig. 5 is an enlarged view in vertical cross section taken in a plane represented by the line 5—5 of Fig. 3 and viewed in the direction of the arrows.

Fig. 6 is an enlarged view in vertical cross section taken on the line 6—6 of Fig. 3 and viewed in the direction of the arrows.

Fig. 7 is an enlarged fragmentary view in perspective of the shank end of the letter opener or blade.

Fig. 8 is an enlarged fragmentary view in perspective of the open end of the formed handle in which is to be slidably mounted the magnifying lens, the view being taken prior to the upending or bending of the projecting tongue or lip to form a stop.

Fig. 9 is a view similar to Fig. 8 but showing the tongue or lip upended or bent upwardly to form a stop.

Referring more particularly to the disclosure in the drawings and to the novel embodiment therein selected to illustrate the invention, there is disclosed a letter opener and magnifying lens assembly comprising a handle 1, a letter opener or blade 2 and a magnifying lens 3, the latter being slidably mounted within the handle whereby it may be extended or withdrawn for use or retracted into the handle when not in use. The handle 1 is formed integral and longitudinally cored at 4 throughout the greater portion of its length for the reception of the magnifying lens 3. It is also longitudinally and transversely slotted at 5 to conformably receive the shank or supporting end 6 of the blade and provided with a transverse opening 7 for the reception of a two-part rivet adapted to project through said opening 7, and an aligned opening 8 in the shank 6 of the blade or opener. As shown more clearly in Figs. 3 and 5, the rivet consists of a male part 9 and a female part 11 each provided with an enlarged head 12 conformably received in a countersunk opening in the upper and lower surface of the handle 1.

In order to lock the shank 6 of the blade 2 in rigid anchored position, this shank is longitudinally slotted at 13 and which slot is aligned with the opening 8 therein for the female part 11 whereby when the male part 9 of the rivet is forced into the opening 14 of the female part of the rivet, the cylindrical wall of the latter is distorted or deformed sufficiently to expand or spread the bifurcations 15 of the shank (see dotted line position in Fig. 7) sufficiently to lock them against the adjacent and shouldered surfaces 16 provided within the handle 1. As more clearly shown in Fig. 5, when so assembled the bifurcations 15 of the shank are supported between spaced lower and upper embossments or lugs 17 and 18 formed within the hollow of the handle, and along the upper and lower edge or lip of the handle where the blade emerges.

The portion of the handle 1 adapted to receive the magnifying lens 3 is provided in its base with spaced ribs 19 providing a channel 20 therebetween, and at the exterior of the ribs 19 there are provided channels 21 for the reception of a pair of spaced depending tracks 22 on the base of the lens 3. In the upper portion of the handle there are provided shoulders 23 for contacting engagement with spaced tracks 24 at the opposite sides of lens 3, and therebetween the handle is cored to provide a domed or convex surface 25. These tracks are coformed or arranged that the upper convex surface 26 and the lower flat surface or base 27 of the lens are maintained out of contact with the ribs 19 and also out of contact with the domed or convex surface 25 in the upper portion of the handle whereby the reading surfaces of the lens are maintained at all times out of contact with the adjacent surface in the handle to prevent any scratching or damage to the magnifying surfaces.

To hold the magnifying lens in any position of adjustment, it is provided with a spring-pressed detent consisting of a cup-shaped member 28 and a coil spring 29 both received within a recess 30 in the under surface of the lens and adjacent the inner end thereof. This spring-pressed detent is conformably received within the channel 20 between the ribs 19, and frictionally maintains the lens in any adjusted position. It also prevents the lens from being completely withdrawn by engagement of this detent with a tongue or lip 31 formed at the outer end of the channel 20.

As shown in Figs. 8 and 9, in the formation of this handle and to permit the core to be withdrawn, the tongue or lip 31 projects outwardly or longitudinally from the end. However, after the core has been withdrawn this tongue is heated and upended or bent upwardly to provide an abutment or stop against which the spring-pressed detent member 28 engages when the magnifying lens is withdrawn to its outermost position. To permit such construction the handle is preferably formed of a thermoplastic composition or resinous material, although it is to be understood that it is not limited thereto but may be formed of any material suitable for the purpose.

In the assembly of the magnifying lens into the hollow of the handle, this may be readily accomplished after the lip or projection has been bent to its operative position as shown in Fig. 9, for the reason that the spring-pressed detent may be readily lifted to clear this projection as the lens is forced rearwardly in the hollow of the handle. The magnifying lens may be of any suitable composition, such as lucite or other material having the desired properties of magnification.

In the assembly of the handle, the cylindrical portion of the female part 9 of the rivet is expanded when the male part 11 is forced into the assembled position shown in Figs. 3 and 5, whereby to distort the bifurcations 15 of the shank 6 of the blade or opener 2 and lock the blade rigidly in assembled relation.

Having thus disclosed the invention, We claim:

A magnifying device comprising an elongated magnifying lens provided along the upper marginal longitudinal edges with upwardly facing tracks and along the lower marginal edges with depending tracks extending below the lower face of said lens, and an elongated hollow handle providing a chamber open at one end for the reception of said lens therein, said chamber being provided with laterally disposed downwardly facing shoulders adapted to cooperate with said upwardly facing tracks in preventing contact between the upper face of said lens and the upper wall of said chamber, and the base of said chamber being shaped to form a pair of upwardly extending spaced ribs providing a central channel and a pair of lateral channels adapted to receive said depending tracks of the lens, the height of said ribs being less than the depth of said tracks so that contact of the lower faces of said tracks with the bottoms of said lateral channels prevents contact between the lower face of said lens and the bottom of said chamber, a spring-pressed detent consisting of a cup-shaped member and a coiled spring disposed in a recess in the lens adjacent the inner end thereof, said cup-shaped member extending into said central channel for frictionally holding the lens against unintentional shifting in the handle, and an abutment projecting upwardly at the outer end of said central channel in the path of said detent whereby complete withdrawal of said lens from said chamber is prevented by engagement of said detent with said abutment.

RICHARD S. KRAUSE.
ERNEST H. SEIBERT.

References Cited in the file of this patent

UNITED STATES PATENTS

| Number | Name | Date |
|---|---|---|
| 889,352 | Bold | June 2, 1908 |
| 1,094,493 | Taber | Apr. 28, 1914 |
| 1,884,968 | Bloch | Oct. 25, 1932 |
| 1,900,930 | Hauser | Mar. 14, 1933 |
| 1,997,131 | Champlin | Apr. 9, 1935 |
| 2,205,974 | Kramer | June 25, 1940 |
| 2,248,140 | Trollen | July 8, 1941 |
| 2,297,232 | Martin et al. | Sept. 29, 1942 |

FOREIGN PATENTS

| Number | Country | Date |
|---|---|---|
| 879,094 | France | Nov. 10, 1942 |